United States Patent [19]

Mrotek et al.

[11] Patent Number: 5,688,612
[45] Date of Patent: Nov. 18, 1997

[54] BATTERY COVER AND VENT CAP INTERFACE SEAL

[75] Inventors: Edward N. Mrotek, Grafton; Thomas J. Dougherty, Waukesha, both of Wis.; Gerald A. Cummins, Union, Ky.; Dean R. Walsten, Slinger, Wis.

[73] Assignee: Globe-Union Inc., Milwaukee, Wis.

[21] Appl. No.: 739,238

[22] Filed: Oct. 29, 1996

Related U.S. Application Data

[63] Continuation of Ser. No. 325,793, Oct. 18, 1994, abandoned.

[51] Int. Cl.$^6$ .................................................. H01M 2/12
[52] U.S. Cl. ............................ 429/89; 429/82; 429/175
[58] Field of Search ............................ 429/54, 53, 55, 429/78, 82, 89, 86, 87, 88, 175

[56] References Cited

U.S. PATENT DOCUMENTS 4,052,534 10/1977 Devitt .................................. 429/86
4,328,290 5/1982 Szymborski et al. .................. 429/54
4,562,126 12/1985 Chartrain et al. ..................... 429/72

Primary Examiner—M. Nuzzolillo
Attorney, Agent, or Firm—Harness, Dickey & Pierce, P.L.C.

[57] ABSTRACT

A battery cover and vent cap interface seal for electrical storage batteries is disposed between the vent opening in the battery cover and the vent cap to establish a fluid-tight seal. In a first embodiment an annular sealing member is provided in each vent opening in the battery cover. The sealing members extend slightly beyond the inner periphery of the vent opening in the cover and are compressed by the vent cap plugs as the vent cap is installed. In a second embodiment annular sealing members are provided around each plug on the vent cap. The sealing members extend slightly beyond the outer periphery of the plugs and are compressed as the vent cap is installed on the battery cover. The sealing members are made of a resilient material that deforms more easily than the materials used for the battery cover and vent cap.

12 Claims, 3 Drawing Sheets

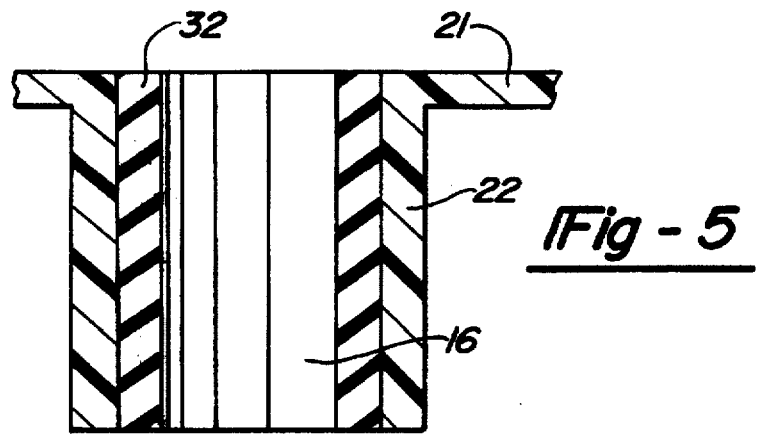
*Fig - 5*
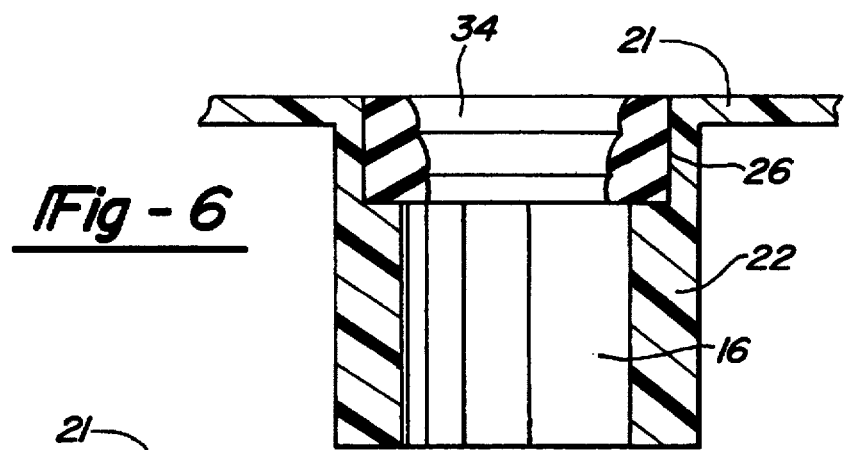
*Fig - 6*
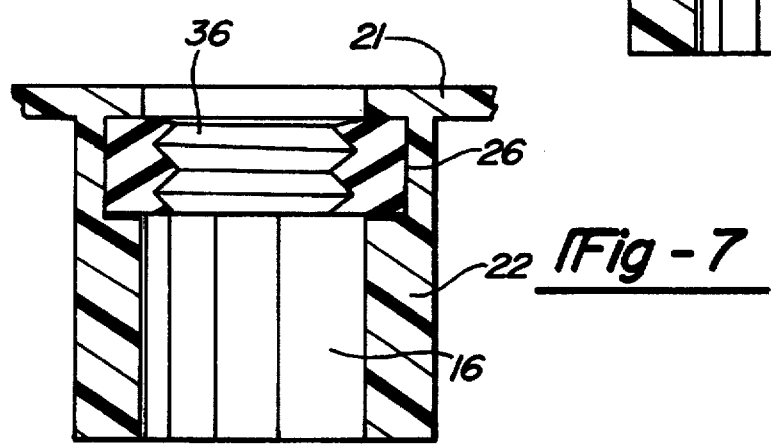
*Fig - 7*
*Fig - 8*
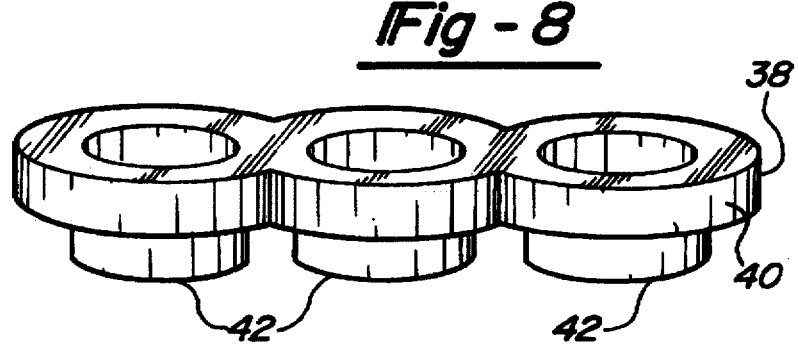

BATTERY COVER AND VENT CAP INTERFACE SEAL

This is a continuation of U.S. patent application Ser. No. 08/325,793, filed Oct. 19, 1994, now abandoned.

BACKGROUND OF THE INVENTION

1. Field of the Invention

The present invention relates generally to an improved sealing arrangement for a battery cover and vent cap. In particular, the invention relates to an interface seal disposed intermediate the side wall of a battery vent opening and the plug portion of a removable vent cap for improving the sealing properties of the vent cap.

2. Description of Related Art

Wet cell electric storage batteries such as those used in automobiles typically include a battery cover having vent openings communicating with each battery cell. The vent openings afford access to the battery cells for initially filling the battery with electrolyte and permit the fluid level to be checked and corrected occasionally during the life of the battery. The vent openings also permit the controlled venting of gases generated during discharging and recharging the battery through integral flame arrestors. During normal operation, however, the vent openings are closed and sealed by vent caps to prevent leakage of gases bypassing the flame arrestors, spillage of electrolyte as well as to avoid intrusion of dirt and dust into the battery cells. Maintaining a gas and liquid-tight seal between the vent openings and vent caps is particularly important in off-road and recreational vehicles where S.L.I. batteries are subject to overcharge and higher levels of vibration and dust and where the battery fluid may be splashed and agitated within the battery.

Several techniques have been used to close and seal battery vent openings. In one such technique, threaded vent plugs are screwed into similarly threaded vent openings and tightened to provide a fluid seal. However, threaded vent plugs often loose their seal due to the vibration of the vehicle engine and frame. In addition, an individual threaded plug is generally required for each vent opening, resulting in a time consuming operation of unscrewing and replacing each plug separately when checking or adding fluid. Finally, the need for multiple threaded plugs (typically six on most automobile batteries) increases the risk of their loss as compared with systems using caps (typically two) on which multiple plugs are formed.

In another known technique, slip-in vent plugs are pressed into each vent opening. Each plug is made of a hard plastic material and dimensioned to provide a slight interference fit with the battery cover surrounding the opening, resulting in a fluid-tight seal. By way of example, in one commercially available battery the outer diameter of the vent plugs is 0.004 to 0.006 inches greater than the inner diameter of the vent opening barrels to ensure a tight fit. Several such plugs are often provided on a vent cap and one or more vent caps are used to cover and seal all cells in the battery. While this technique provides convenient and quick access to the battery cells and effective sealing upon initial filling of the battery, it also has certain shortcomings. It has been found that as the vent caps are repeatedly removed and replaced the plugs and vent openings gradually deform plastically, resulting in a reduced interference fit and inferior sealing. Similarly, because the vent cap plugs and vent opening barrels typically expand and contract at different rates, inferior sealing may result from deformation due to successive heating and cooling cycles to which the battery is submitted during normal operation. Moreover, misalignment between multiple plugs on a single vent cap due to normal manufacturing tolerances may cause additional deformation of the plugs and vent holes, further degrading the vent cap seal. Finally, vibration from the engine and general operating environment, particularly in off-road and recreational vehicles, ultimately loosens the fit between the vent cap plugs and the vent openings, again resulting in a poor seal.

The present invention advantageously provides an improved sealing arrangement for batteries that is less susceptible to the effects of plastic deformation and is thus able to provide effective sealing despite repeated removal and replacement of the vent cap.

The invention also advantageously provides an interface seal between vent cap plugs and vent openings that affords a gas and liquid-tight seal even in environments where the battery is subject to considerable vibration.

The invention further provides a battery vent seal that may be conveniently incorporated in battery cover vent openings or on the plugs of battery vent caps, and that renders the plugs and openings less susceptible to plastic deformation due to slight misalignment of the plugs or openings.

SUMMARY OF THE INVENTION

In accordance with one aspect of the invention, there is provided an improvement for electric storage batteries including a battery cover having at least one vent opening and a vent cap for selectively plugging the vent opening. The improvement comprises an interface seal disposed intermediate the battery cover and the vent cap at the vent opening, thereby establishing a gas and liquid-tight seal therebetween.

In accordance with another aspect of the invention, a cover is provided for an electric storage battery. The cover comprises a substantially planar panel having at least one vent opening and a substantially cylindrical wall portion joined to the panel and surrounding the vent opening for receiving a vent cap. A sealing member is disposed within the wall portion and is configured to contact the vent cap and thereby to establish a gas and liquid-tight seal at the vent opening.

In accordance with a further aspect of the invention, a vent cap is provided for an electric storage battery. The vent cap includes at least one plug configured to extend into a vent opening in the battery cover and a sealing member disposed around the plug. The sealing member is configured to contact the battery cover and thereby to establish a gas and liquid-tight seal at the vent opening.

BRIEF DESCRIPTION OF THE DRAWINGS

The present invention will become more fully understood from the following detailed description, taken in conjunction with the accompanying drawings, wherein like reference numerals refer to like parts, in which:

FIG. 5 is a sectional view of an alternative configuration of the sealing member fitted into a vent opening;

FIG. 6 is a sectional view of another alternative configuration of the sealing member fitted into a vent opening;

FIG. 7 is a sectional view of a further alternative configuration of the sealing member fitted into a vent opening; and FIG. 8 is a perspective view of an alternative configuration of three sealing members molded integrally in an insert designed to be fitted to the cover of a battery.

DESCRIPTION OF THE PREFERRED EMBODIMENTS

Before beginning the detailed description of the FIGURES and the preferred embodiments shown therein, several general comments will assist in understanding the scope of the invention.

The most preferred and illustrated embodiments include a resilient sealing member disposed intermediate the vent plugs and the wall portions of the battery cover defining the vent openings. While these sealing members are preferably molded to either the vent plugs or battery cover, they may generally be fitted to the vent plug or vent opening in any manner that effectively prevents their accidental removal and provides a gas and liquid-tight seal. For example, when prefabricated sealing members are added to the battery cover or vent cap during assembly, the sealing members may be adhesively secured in place.

The sealing members are preferably made of a resilient rubber such as EPDM terpolymer. However, any suitable material may be used that provides the desired sealing characteristics and has a sufficient chemical resistance to the electrolyte present in the battery. Moreover, the sealing members are generally softer than the material of which the battery cover and vent cap are made to ensure that any significant deformation required for sealing is concentrated in the sealing members. The precise properties of the sealing members, including their hardness and dimensions may be determined for the specific application through simple experimentation.

Finally, while a conventional six-cell vehicle battery is illustrated in the FIGURES and described in the following discussion, the invention is not limited use on such batteries, but is equally suited for use on smaller and larger batteries as well as batteries designed for other applications, such as for marine use.

Figure 1:
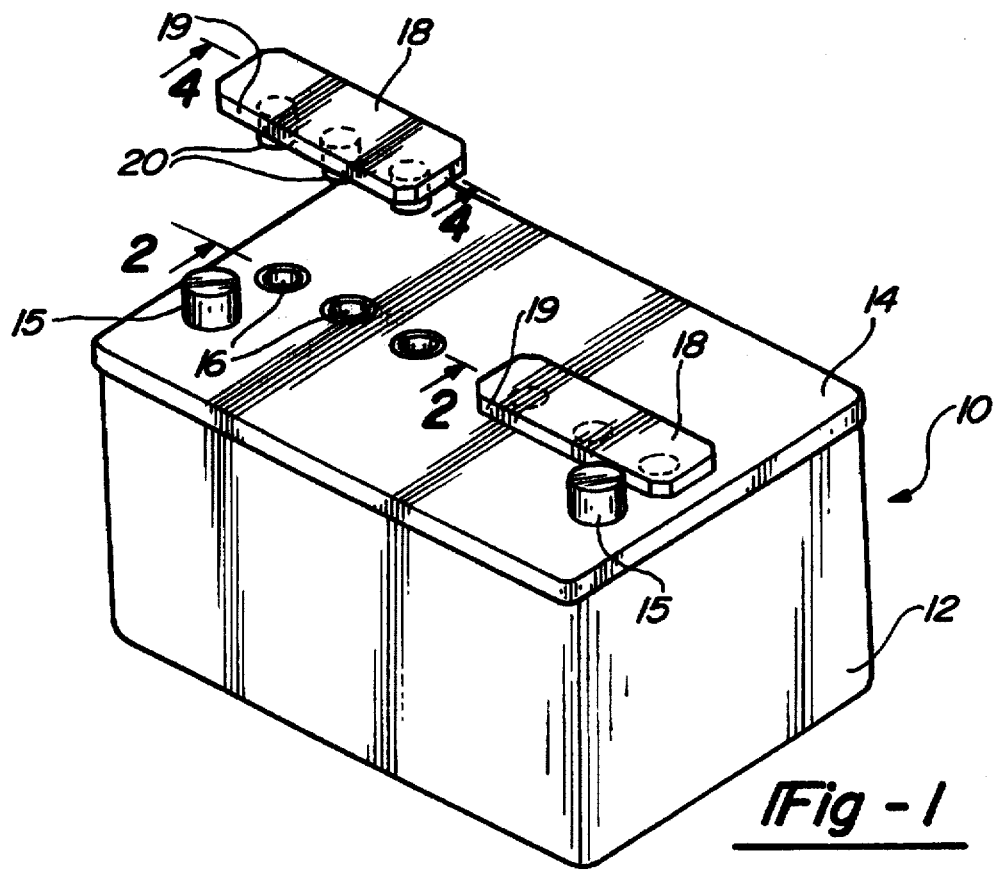
FIG. 1 is a partially exploded, top perspective view of a battery incorporating a sealing arrangement in accordance with the invention wherein a vent cap has been removed to show three vent openings.

Turning now to the drawings and referring to FIG. 1, an electric storage battery 10 is illustrated as including a container 12 and a cover 14 sealed to container 12. Container 12 houses electrodes and electrolyte (not shown) for producing electrical energy. Container 12 may be internally divided into individual cells and each such cell generally contains electrodes and electrolyte, the electrodes being coupled to produce the desired voltage level. Terminals 15 are coupled to the battery electrodes and extend through cover 14. Vent openings 16 are formed in cover 14. Vent openings 16 facilitate initial filling of container 12 with electrolyte as well as periodic checks of the electrolyte level, and permit venting of gases generated during discharge and recharge of battery 10.

Vent caps 18 are provided for covering vent openings 16. As illustrated in FIG. 1, each vent cap 18 includes a flame arrestor 19 for directing gases from the interior of battery 10 to the atmosphere, as well as a series of plugs 20 appropriately spaced to enter into vent openings 16 when vent cap 18 is installed on cover 14. Vent cap 18 and cover 14 are made of a hard plastic material resistant to the battery electrolyte and are dimensioned to establish a snug fit between vent openings 16 and plugs 20.

Figure 2:
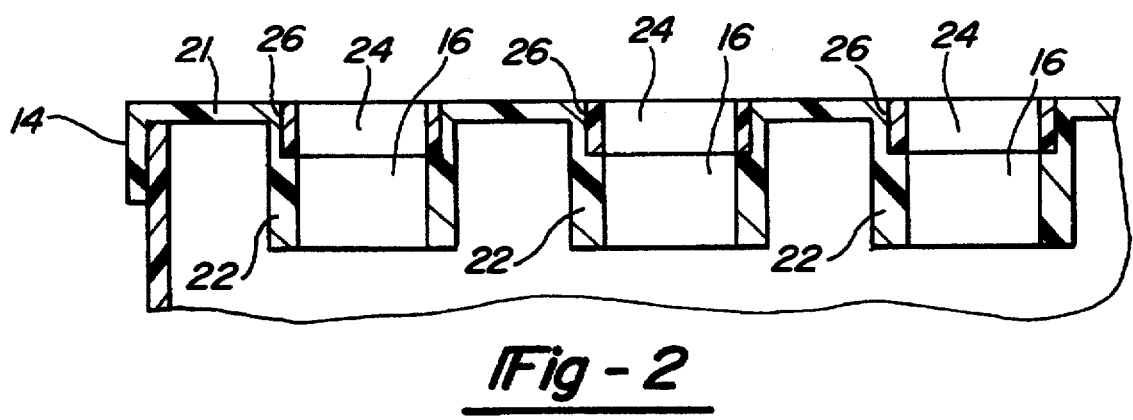
FIG. 2 is a partial sectional view through the cover of the battery in FIG. 1 along section 2—2 illustrating a first preferred embodiment of the invention in which sealing members are provided in the battery cover.
Figure 3:
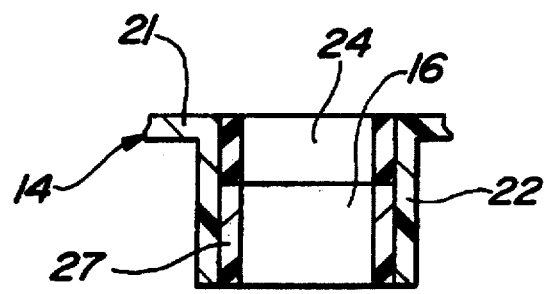
FIG. 3 is a partial sectional view through the cover of the battery in FIG. 1 along section 2—2 depicting a variant of the embodiment shown in FIG. 2 in which sealing members are incorporated into an insert in the vent openings.

Cover 14 includes a substantially planar panel 21 from which substantially cylindrical barrels or walls 22 extend to define and surround vent openings 16. Cylindrical walls 22 are generally formed integrally with cover 14, as shown in FIG. 2. In a first preferred embodiment of the invention, an annular sealing member 24 similarly surrounds each vent opening 16 in cover 14. Sealing members 24 extend over a portion of the length of cylindrical walls 22 and may be conveniently lodged in annular recesses 26 formed in cylindrical walls 22 as illustrated in FIG. 2. Alternatively, sealing members 26 may be incorporated into an insert 27, as shown in FIG. 3, prepared separately from cover 14 and then secured to cylindrical walls 22 in a later operation, such as by gluing, ultrasonic welding or by any other suitable method. In either case, sealing members 24 may be located adjacent to the upper or the lower end of vent openings 16, or at any location intermediate the ends along cylindrical walls 22.

Sealing members 24 may be affixed to cylindrical walls 22 in any suitable manner, such as adhesively. Sealing members 24 abut cylindrical walls 22 and have an inner diameter slightly smaller than that of walls 22 such that sealing members 24 extend inwardly into vent openings 16 slightly beyond the inner periphery of walls 22. As conventional vent plugs 20 are pressed into vent openings 16, they compress sealing members 24 and establish a fluid-tight seal between cylindrical walls 22 and vent cap 18. The amount sealing members 24 extend inwardly beyond cylindrical walls 22 will depend upon the type of material used for sealing members 24 and the desired tightness of the seal, but is typically of the order of several thousandths of an inch. When sealing members 24 are provided in cover 14 vent cap 18 and plugs 20 may be of conventional design.

Because a gas and liquid-tight seal is established by elastic deformation of sealing members 24, there is generally no need to rely upon interference between plugs 20 and walls 22 for sealing. This reduces the susceptibility of cover 14 and cap 18 to plastic deformation due to removal and replacement of cap 18 and from thermal expansion and contraction cycles. Moreover, because sealing members 24 are positioned between plugs 20 and walls 22, members 24 tend to be wiped clean by plugs 20, and may wick fluid from within battery 10 between plugs 20 and walls 22, further enhancing their sealing properties.

Figure 4:
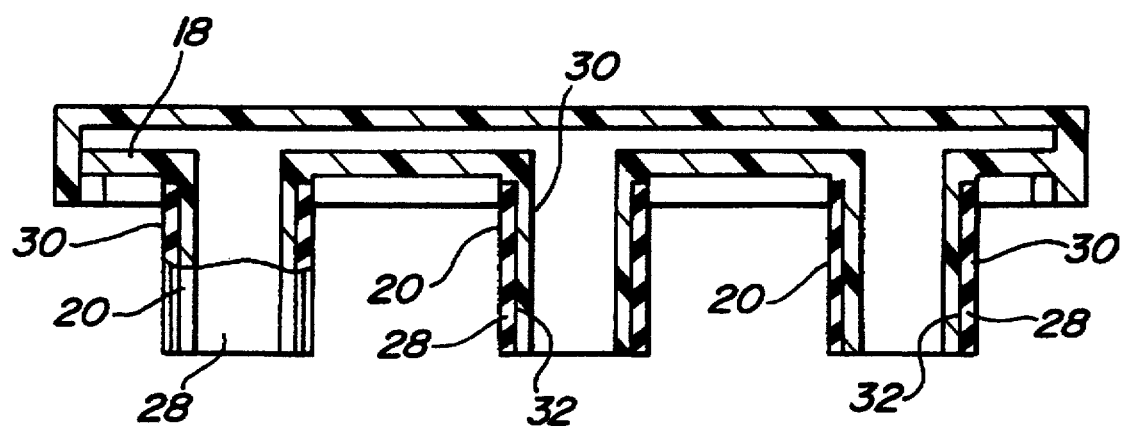
FIG. 4 is a sectional view through a vent cap as illustrated in FIG. 1 along section 4—4 illustrating a second preferred embodiment in which sealing members are incorporated in a battery vent cap.

In a second preferred embodiment illustrated in FIG. 4, sealing members 28 are incorporated into vent cap 18, which may be used with a conventional cover 14 having no sealing members. Sealing members 28 are generally similar to sealing members 24, but are affixed to the outer walls 30 of plugs 20. Recesses 32 may be provided in outer walls 30 to facilitate placing and retaining sealing members 28 on plugs 20. Moreover, sealing members 28 may be placed adjacent to the lower ends of plugs 20 or at any location along the plugs and may be molded onto the plugs or secured in any suitable manner, such as adhesively.

In this second embodiment, sealing members 28 extend radially outwardly slightly beyond the outer diameter of plugs 20. Thus, when plugs 20 are pressed into vent openings 16 of conventional design, sealing members 28 are compressed to establish a fluid-tight seal between outer walls 30 of plugs 20 and cylindrical walls 22 of vent openings 16. As in the first embodiment discussed above, the amount sealing members 28 extend beyond outer walls 30 will depend upon the material used for sealing members 28 and the desired tightness of the seal, but is typically of the order of several thousandths of an inch.

It should be noted that the sealing members discussed above, particularly those positioned within vent openings 16, may have various lengths and profiles, as illustrated in FIGS. 5, 6 and 7. As illustrated in FIG. 5, sealing members 32 may extend over the entire length of walls 22 surrounding vent opening 16. Various profiles, other than the rectangular profile depicted in FIGS. 2 and 3, may be used to improve the sealing properties of the sealing members, facilitate insertion of vent caps 18 and aid in retaining vent cap 18 once inserted. By way of example, seal 34 may include a wave profile as illustrated in FIG. 6, or a polyseal 36 may be positioned within a retaining recess 26 as shown in FIG. 7.

Finally, various alternative configurations may be envisaged for the sealing members to facilitate their fabrication and assembly in battery cover 14. In one such alternative configuration, as illustrated in FIG. 8, a sealing unit 38 includes a unitary top member 40 on which sealing members 42 are integrally formed. Sealing unit 38 might be formed completely separately from cover 14, such as by injection molding, and inserted into a corresponding relief in cover 14 with sealing members 42 entering and lining vent openings 16.

We claim:

1. In an electric storage battery including a battery cover having a substantially cylindrical wall portion surrounding a vent opening and a vent cap having a cylindrical plug for selectively plugging the vent opening, the improvement comprising an interface seal disposed intermediate the cylindrical wall portion and the cylindrical plug and formed integral with a generally annular recess formed in one of the cylindrical wall portion and the cylindrical plug, thereby establishing a gas and liquid-tight seal therebetween.

2. The improvement set forth in claim 1 wherein the interface seal is molded into the annular recess.

3. The improvement set forth in claim 1 wherein the interface seal has a substantially rectangular profile.

4. The improvement set forth in claim 1 wherein the interface seal has a non-rectangular profile.

5. The improvement set forth in claim 1 wherein the interface seal is made of a resilient polymeric material.

6. A cover for an electric storage battery comprising:

a substantially planar panel having at least one vent opening;

a substantially cylindrical wall portion joined to the panel and surrounding the vent opening for receiving a vent cap;

a recessed portion formed in the substantially planar panel; and a sealing unit disposed within the recessed portion and formed integral to the substantially planar panel, the sealing unit having a unitary base member portion for engaging the recessed portion and sealing members formed integral to the base member portion, the sealing member disposed at least partially within the wall portion and configured to contact the wall portion and the vent cap and thereby establish a fluid-tight seal at the vent opening.

7. The cover set forth in claim 6 wherein the sealing unit is adhesively affixed in the recessed portion.

8. The cover set forth in claim 6 wherein the cover includes six vent openings, and the sealing unit includes six sealing members.

9. The cover set forth in claim 6 wherein the sealing member has a non-rectangular profile.

10. A removable vent cap for an electric storage battery including a cover having at least one vent opening, the vent opening having a substantially cylindrical wall portion, comprising:

at least one substantially cylindrical plug configured to extend into the vent opening;

a recessed portion formed about the plug;

a sealing unit disposed around the plug and within the recessed portion, the sealing unit having an unitary base portion and a sealing member formed integral to the base portion and configured to contact the wall portion and the plug and thereby to establish a fluid-tight seal at the vent opening.

11. The vent cap as set forth in claim 10 wherein the sealing unit is adhesively affixed within the recessed portion.

12. The vent cap set forth in claim 10 wherein the vent cap includes a plurality of plugs, and the sealing unit includes a like plurality of sealing members.

* * * * *